(12) United States Patent
Ginman et al.

(10) Patent No.: US 6,724,301 B2
(45) Date of Patent: Apr. 20, 2004

(54) TIRE TO WHEEL DATA TRANSFER SYSTEM

(75) Inventors: Charles D. Ginman, Livonia, MI (US); Gary L. Gray, Waterford, MI (US)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/988,808

(22) Filed: Nov. 20, 2001

(65) Prior Publication Data
US 2003/0122661 A1 Jul. 3, 2003

(51) Int. Cl.[7] .............................................. B60C 23/00
(52) U.S. Cl. ........................ 340/447; 340/442; 340/449; 340/444; 340/445; 340/454; 340/539.1
(58) Field of Search .......................... 340/447, 449, 340/442, 445, 444, 454, 539.1

(56) References Cited

U.S. PATENT DOCUMENTS

| 5,500,065 | A | * | 3/1996 | Koch et al. | 340/447 |
|---|---|---|---|---|---|
| 5,562,787 | A | | 10/1996 | Koch et al. | 340/445 |
| 5,573,610 | A | | 11/1996 | Koch et al. | 340/447 |
| 5,573,611 | A | | 11/1996 | Koch et al. | 340/447 |
| 5,731,754 | A | | 3/1998 | Lee, Jr. et al. | 340/447 |
| 5,838,229 | A | | 11/1998 | Robinson, III | 340/442 |
| 5,960,844 | A | | 10/1999 | Hamaya | 340/447 |
| 5,977,870 | A | * | 11/1999 | Rensel et al. | 340/447 |
| 6,278,363 | B1 | * | 8/2001 | Bezek et al. | 340/442 |
| 6,441,728 | B1 | * | 8/2002 | Dixit et al. | 340/447 |
| 6,463,798 | B2 | * | 10/2002 | Niekerk et al. | 340/447 |

* cited by examiner

Primary Examiner—Jeffery Hofsass
Assistant Examiner—Daniel Previl
(74) Attorney, Agent, or Firm—Smith, Gambrell & Russell, LLP

(57) ABSTRACT

A system for monitoring various engineering conditions of a vehicle tire/wheel assembly such as temperature, pressure, tire rotation and other operating conditions of the tire and wheel. A tag with radio frequency read/write capability is located on the tire and includes data storage of tire identification and tire specific information. A tag with radio frequency read/write capability is located on the wheel and includes data storage of wheel identification and wheel specific information. Either tag may act as permanent storage devices including the information of both tags when queried by transmitted radio frequency waves.

10 Claims, 1 Drawing Sheet

TIRE TO WHEEL DATA TRANSFER SYSTEM

BACKGROUND OF THE INVENTION

This invention relates to data transfer of vehicular tire and wheel information, and more particularly to a vehicular dual tag tire and wheel radio frequency identification system which uses both a tire tag including tire information, and a wheel tag including wheel information, of a tire/wheel assembly to store and transfer identification and specific integrity information.

It is desirable to monitor the condition of tires as to wear, internal temperature and internal pressure. It is particularly advantageous to monitor large truck tires since these are expensive and must be regularly maintained to maximize vehicle efficiency. In the past, such monitoring activities generally used a passive integrated circuit embedded within the body of the tire and activated by a radio frequency transmission which energizes the circuit by inductive magnetic coupling. Passive devices which rely on inductive magnetic coupling or capacitive coupling generally have the disadvantage of requiring lengthy coil windings, thus requiring major modifications in the tire construction and assembly process. Another serious disadvantage with such passive devices is that an interrogator must be positioned in very close proximity to the tire, usually within a few inches of the tire, in order to allow communication between the tire and the device. Because of the proximity requirements, continuous monitoring is impractical since it would require that an interrogator be mounted at each wheel of the vehicle. Manual acquisition of data from the passive devices embedded in each of the tires of a parked vehicle is also cumbersome and time consuming because of the proximity requirements.

Another disadvantage with known tire monitoring and identification devices is that communication transmissions are achieved using conventional radio frequencies which generally require a relatively large antenna which must be mounted externally or secured to the tire in such a manner which requires relatively major modifications in the tire construction or assembly process.

Prior approaches to monitoring tire conditions and identification with various communication techniques have met with limited success. In one approach disclosed in U.S. Pat. No. 5,960,844, a method for monitoring tires was depicted. The method included an activatable memory device or tag permanently mounted within at least one tire of a vehicle on the inner surface. The device contained stored data pertaining to the tire, and in which the memory device was activated by means of a monitoring device mounted on the tire rim within the pressurizable cavity formed within the tire.

In a different approach shown in U.S. Pat. No. 5,573,610, a method for monitoring various conditions of pneumatic tires and to tires containing a monitoring device was depicted. The invention disclosed a method of monitoring tires which used an active, self-powered, programmable electronic device which was generally installed in or on the interior portion of a pneumatic tire or on a tire rim. The device could be used for monitoring, storing and telemetering information such as temperature, pressure, tire mileage and/or other operating conditions of a pneumatic tire along with tire identification information.

In yet another approach, U.S. Pat. No. 5,562,787, a method of monitoring tires was provided in which an activatable monitoring device or tag was mounted within at least one tire of a vehicle, on the interior surface thereof, or on the tire rim. The device was activated by means of an interrogator signal having a frequency in the microwave range. In response to the signal, the monitoring device measured and transmitted information relating to one or more conditions such as the internal pressure and temperature of the tire, the number of rotations of the tire, and tire identification information. The monitoring device was secured within the tire in such a manner and location as to minimize stress, strain, cyclic fatigue, impact and vibration.

In still yet another approach, U.S. Pat. No. 5,573,611, the invention depicted was a method of monitoring tires which used an active, self-powered programmable electronic device which was installed in or on the interior surface of a pneumatic tire or on a tire rim. The device was activated by externally transmitted radio frequency waves and in response, the device compared or transmitted information and provided a warning in the event a preselected limit was exceeded. An interrogator was used to communicate with and retrieve digitally coded information from the electronic monitoring device.

In U.S. Pat. No. 5,838,229, a system for indicating low tire pressure in vehicles was depicted. Each vehicle wheel had a transmitter with a unique code. A central receiver in the vehicle was taught, at manufacture, to recognize the codes for the respective transmitters for the vehicle, and also a common transmitter code, in the event one of the transmitters needed to be replaced. During vehicle operation and maintenance, when the tires were rotated, the system could be recalibrated to relearn the locations of the transmitters.

In another application, U.S. Pat. No. 5,731,754, the invention included a transponder and sensor apparatus with on-board power supply mounted in or on a vehicle tire. A pressure sensor, a temperature sensor and a tire rotation sensor were mounted in a housing along with the transponder, the power supply and an antenna. Upon receipt of an interrogation signal from a remote interrogator, the transponder activated the sensors to sense tire pressure and temperature and then backscatter-modulate the radio frequency signal from the interrogator with the tire condition parameter data from the sensors to return the backscatter modulated signal to the interrogator.

In yet another application, U.S. Pat. No. 5,977,870, a method for monitoring various engineering conditions of a pneumatic tire such as temperature, pressure, tire rotation and other operating conditions of the tire was depicted. A tire tag was mounted on the interior of the tire within the pressurizable cavity and contained the stored data and sensors for detecting certain conditions within the cavity. A separate transponding device was mounted on the tire rim. The tire tag contained a battery, an antenna and stored data pertaining to the tire. The transponding device used electronic circuitry for collecting data from the tire tag. The tire tag was actuated by transmitted radio frequency waves from the transponding device, which data was transmitted by the transponding device to the remote location by an antenna which extended from the transponding device through the rim to a location externally of the tire.

In spite of the teachings of the above-mentioned patents, there is still a significant need for a tire and wheel monitoring system for sensing, storing and transmitting condition data on command from an interrogator that would preserve the data should either the tire or wheel be discarded. This will mean that the tire and wheel data storage site and other pertinent information such as pressure and temperature sensing, will remain relatively protected on the wheel or tire. This will also eliminate the potential for the monitoring tag negatively affecting the integrity of the tire. For example, when the tire is replaced, this will also ensure that the temperature/pressure sensing technology will remain on the wheel with the vehicle. As tires wear out and are replaced, the old tire's identification and information can be read from the new tire and written to the wheel tag for protected storage.

SUMMARY OF THE INVENTION

The present invention relates to a dual tag tire and wheel radio frequency identification (RFID) system in a tire/wheel assembly of a vehicle. The system is capable of sending tire and wheel condition parameter data to a remote interrogator in response to a radio frequency (RF) signal from the remote interrogator. The system comprises a tire tag located on a tire of a tire/wheel assembly with RF read/write capability, and a wheel tag located on a wheel of the tire/wheel assembly with RF read/write capability. Both tags also have the ability to store data pertinent to wheel and tire condition. This system provides a tire and wheel monitoring system that will not lose stored data should either the tire or the wheel of a tire/wheel assembly be discarded due to rotation, replacement or destruction. In addition, the placement of a tag on the wheel will eliminate the potential for the tire tag and/or tire pressure and temperature monitoring to negatively affect the integrity of the tire. This design will also ensure that pertinent tire condition data such as temperature/pressure sensing technology will remain on the wheel with the vehicle.

In a preferred embodiment of the invention, the system includes a temporary RFID tag located on an interior surface of a tire. A permanent RFID tag is located on a wheel. Once the tire is mounted on the wheel a remote interrogator could read the tire identification and information from the tire RFID tag and then write this information to the RFID tag on the wheel. This process would transfer the tire identification and information from the tire RFID tag to the wheel RFID tag. The RFID tag on the tire would only have to be robust enough to survive until the tire identification and information is transferred to the RFID tag on the wheel. In this embodiment the wheel RFID tag would act not only as a tire pressure monitoring system (TPMS) but would also serve as a remote database for the identification and information of both the tire and the wheel. As tires wear out and are replaced, the old tire's identification and information could be erased and the new tire's identification and information could be read from the new tire and written to the wheel RFID tag for protected storage.

In an alternative preferred embodiment the system of the present invention includes a temporary RFID tag for the wheel. Replacement or destruction of the wheel would ensure that identification and other information is preserved because of storage on the tire RFID tag.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENT

Figure 1:
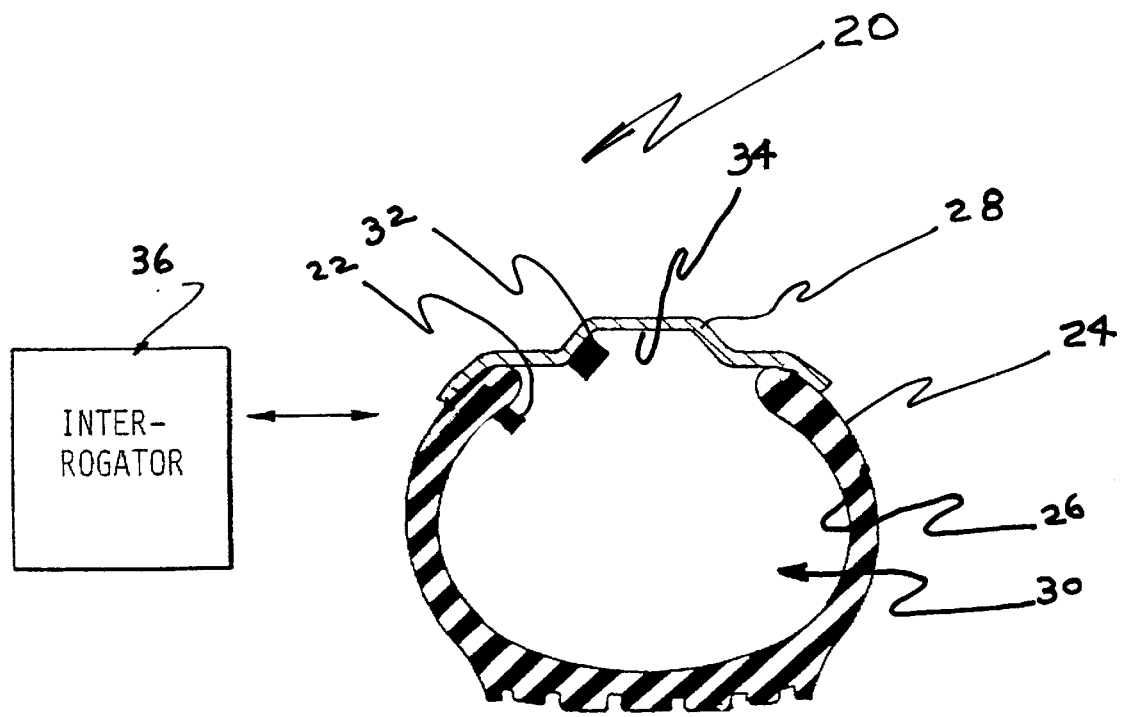
FIG. 1 is a fragmentary cross-sectional view of a tire/wheel assembly with a remote interrogator including a preferred embodiment of the invention.

In FIG. 1, a tire/wheel assembly 20 is shown with a preferred embodiment of the invention. A radio frequency identification (RFID) tire tag 22 is secured on a tire 24 preferably to an inner wall 26 or liner (not shown). The radio frequency (RF) capability of the RFID tire tag 22 permits read/write capability with other electronic equipment. The tire 24 is mounted on a wheel 28 which forms an internal pressure chamber of cavity 30. The RFID tire tag includes a memory device (not shown), a monitoring or sensing device (not shown), and an antenna (not shown) all of a design that is well known to those skilled in the art. The memory device (not shown) contains stored data, such as identification information pertaining to the particular tire 24 on which the RFID tire tag 22 is mounted. The sensing device (not shown) includes sensors which senses or monitors an engineering condition of the tire 24 such as the internal temperature and/or pressure.

The RFID tire tag 22 may be assembled with the tire 24 during its manufacture or secured thereto by a solvent or heat activatable adhesive process that is known in the art. With either method used, whether at manufacture or subsequently attached, the RFID tire tag 22 need only survive until it can transfer its data, stored and monitored to the RFID wheel tag 32.

The RFID wheel tag 32 is a device similar to the RFID tire tag 22 with RF capability, but of a more permanent nature. Whether the permanency of the RFID wheel tag 32 is achieved at its manufacture and attachment to the wheel 28, or a later known attachment as recognized in the art, the RFID wheel tag 32 is permanently affixed to the wheel 28. In FIG. 1, the RFID wheel tag 32 is mounted to an outer surface 34 of the wheel 28. The RFID wheel tag 32 will include the wheel identification, wheel specific information, and monitoring and sensing technology necessary to operate as a tire pressure monitoring system (TPMS). Thus, the RFID wheel tag 32 serves as a remote database for the identification and specific information of both the tire 24 and the wheel 28 as prompted by an interrogator 36.

In operation, once the tire 24 is mounted on the wheel 28, a remote interrogator 36 could read the tire identification and specific information from the RFID tire tag 22 and then write this information to the RFID wheel tag 32. This process would transfer the tire identification and information from the RFID tire tag 22 to the RFID wheel tag 32. This would allow the tire identification and information to be in a more protected data storage site, the RFID wheel tag 32. Therefore, the RFID tire tag 22 on the tire 24 would only have to be robust enough to survive until the identification and specific information was transferred to the RFID wheel tag 32. As tires wear out and are replaced, the old tire's identification and specific information could be erased and the new tire's identification and specific information could be read from the new tire and written to the wheel RFID tag for protected storage.

The interrogator 36 could be remotely located in a vehicle to permit intermittent monitoring at regular intervals to alert the driver of the vehicle of any imminent or impending problems such as over or under inflation or abnormally high temperatures. Alternatively, the interrogator 36 could be located at a vehicle service stop, or any other convenient location for archival and/or current sensor readouts.

Figure 2:
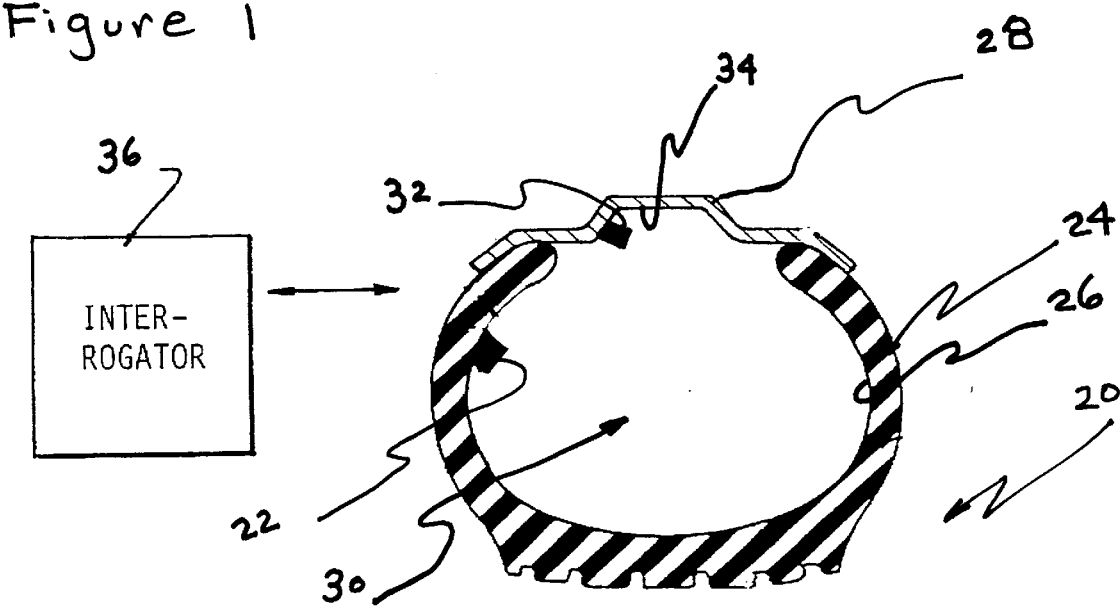
FIG. 2 is a fragmentary cross-sectional view of a tire/wheel assembly with a remote interrogator including an alternative preferred embodiment of the invention.

Referring to FIG. 2, the RFID tire tag 22 is permanent and the RFID wheel tag 32 is temporary. This design would allow the roles to be reversed for the tags as disclosed above where the RFID wheel tag 32 is permanent. The design accommodates the situations, although not as frequent as in tire replacement, where the wheel 28 is destroyed and/or replaced and the identification and information is needed to be stored. Additional situations could exist where the cost of manufacture or placement of the RFID wheel tag 32 as a permanent device on the wheel 28 was undesirable by the vehicle owner. Temporary RFID tags, whether on the wheel 28 or the tire 24 could give limited short term monitoring and data storage.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A dual tag tire and wheel radio frequency identification system in a tire/wheel assembly of a vehicle and capable of sending sensed tire and wheel condition parameter data to an interrogator in response to a radio frequency signal from the remote interrogator, the system comprising:

a tire tag located on an interior surface of a tire of said tire/wheel assembly with radio frequency read/write capability, and including data storage of tire identification and tire specific information; and a wheel tag located on a wheel of said tire/wheel assembly with radio frequency read/write capability, and including data storage of wheel identification and wheel specific information, wherein said tire identification and said tire specific information is transferred on command by the interrogator to said wheel tag for permanent storage, and wherein said wheel identification and said wheel specific information is transferred on command by the interrogator to said tire tag for permanent storage.

2. The dual tag tire and wheel system according to claim 1, wherein said tire tag is temporary and can be discarded.

3. The dual tag tire and wheel system according to claim 1, wherein said tire tag permanent.

4. The dual tag tire and wheel system according to claim 1, wherein said wheel tag is temporary and can be discarded.

5. The dual tag tire and wheel system according to claim 1, wherein said wheel tag is permanent.

6. The dual tag tire and wheel system according to claim 1, wherein the interrogator is remotely located to said tire and wheel tags.

7. The dual tag tire and wheel system according to claim 1, wherein said wheel tag includes tire pressure monitoring.

8. The dual tag tire and wheel system according to claim 1, wherein said wheel tag includes temperature monitoring.

9. The dual tag tire and wheel system according to claim 1, wherein said wheel tag includes monitoring tire revolutions.

10. The dual tag tire and wheel system according to claim 1, wherein said wheel tag includes monitoring tire/wheel assembly rotations, front to rear and rear to front, for locations on said vehicle.

* * * * *